United States Patent [19]

Lee

[11] 4,429,391

[45] Jan. 31, 1984

[54] FAULT AND ERROR DETECTION ARRANGEMENT

[75] Inventor: Robert C. Lee, Glen Ellyn, Ill.

[73] Assignee: Bell Telephone Laboratories, Incorporated, Murray Hill, N.J.

[21] Appl. No.: 259,980

[22] Filed: May 4, 1981

[51] Int. Cl.³ .......................................... G06F 11/10
[52] U.S. Cl. .................................................... 371/49
[58] Field of Search ................................. 371/3, 49

[56] References Cited

U.S. PATENT DOCUMENTS

| | | | |
|---|---|---|---|
| 3,405,258 | 10/1968 | Godoy et al. | 371/3 |
| 3,465,132 | 9/1969 | Crockett et al. | 371/3 |
| 3,491,337 | 1/1970 | Guzak et al. | 371/3 |
| 3,760,107 | 9/1973 | Duerdoth et al. | 179/15 |
| 3,823,269 | 7/1974 | Saito | 179/15 |
| 3,830,982 | 8/1974 | Christiansen | 179/15 |
| 3,840,706 | 10/1974 | Krasin et al. | 179/15 |
| 3,937,895 | 2/1976 | Karl | 179/15 |
| 3,963,869 | 6/1976 | Caldwell | 179/15 |
| 4,022,979 | 5/1977 | Smith | 179/15 |
| 4,046,964 | 9/1977 | Daugherty et al. | 179/15 |
| 4,048,445 | 9/1977 | Ghisler | 179/15 |
| 4,064,369 | 12/1977 | Battocletti | 179/15 |
| 4,149,038 | 4/1979 | Pitroda et al. | 179/15 |

*Primary Examiner*—Charles E. Atkinson
*Assistant Examiner*—Michael R. Fleming
*Attorney, Agent, or Firm*—K. H. Samples; R. T. Watland

[57] ABSTRACT

A fault and error detection arrangement for detecting transmission and routing errors made by systems in which a central data transmitter/receiver (601, 610) bidirectionally intercommunicates with peripheral circuits (620) through an interconnection arrangement (604). The parity bits of certain data words transmitted by the central data transmitter (601) are intentionally inverted by a central parity inverter (602), in a known sequence. Data words transmitted by the central data transmitter (601) are routed by the interconnection arrangement (604) to the peripheral circuits (620) where parity is checked by a peripheral parity checker (621) and a parity invert signal is generated when an inverted parity data word is found. A peripheral parity inverter (623) included in each peripheral circuit (620) responds to the parity invert signals by inverting the parity bit of the next data word transmitted by a peripheral data transmitter (622) also included in each peripheral circuit (620). The data words transmitted by each peripheral circuit (620) are routed by the interconnection arrangement (604) to a central parity checker (610) in time-multiplexed channels. By the operation of the above arrangement, a known sequence of data words having inverted parity bits should be received by the central parity checker (610). An error signal generator (612) generates error signals when deviations from the expected sequence are detected.

16 Claims, 17 Drawing Figures

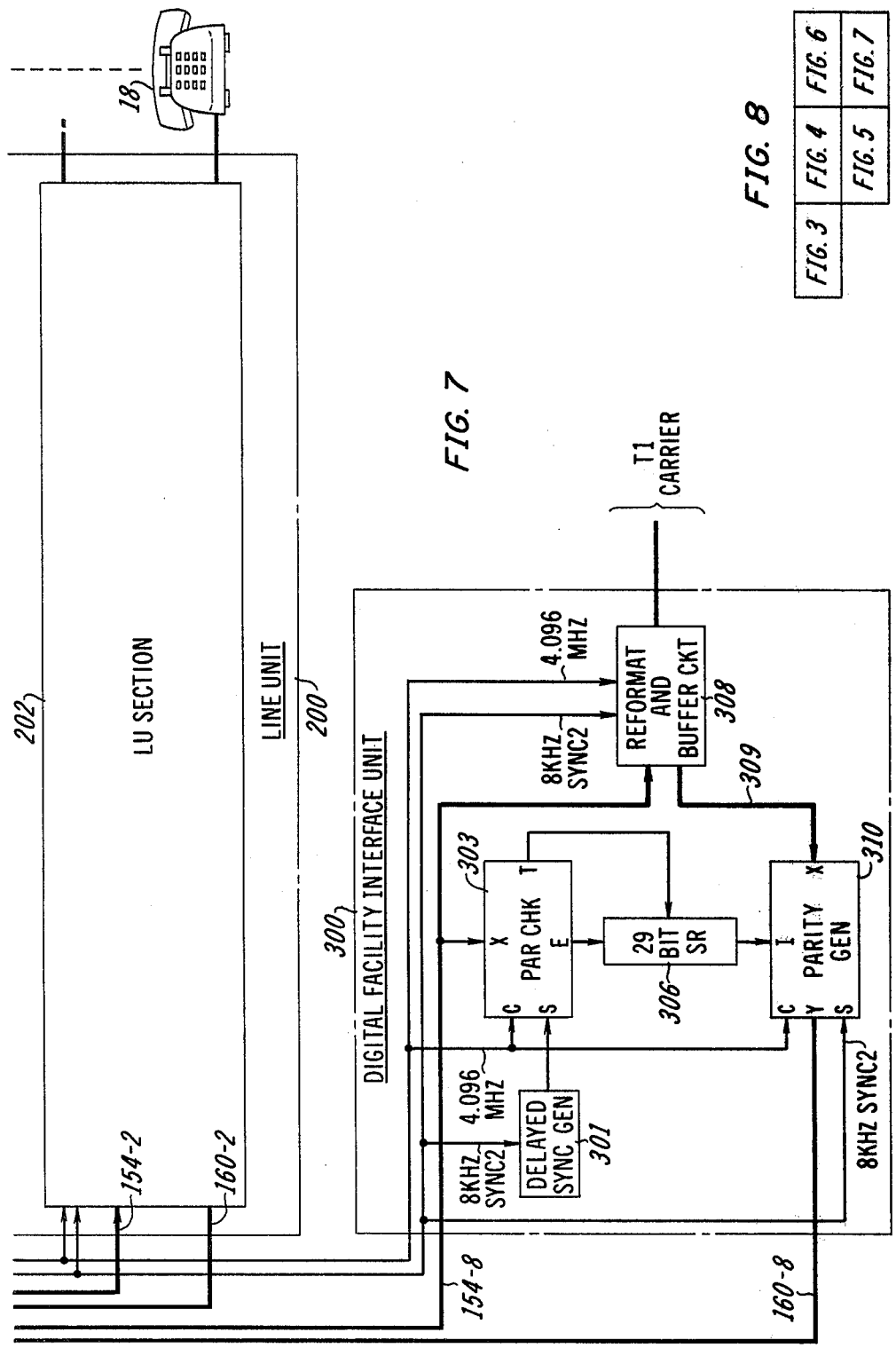

PARITY GENERATOR(130,242,310) TIMING

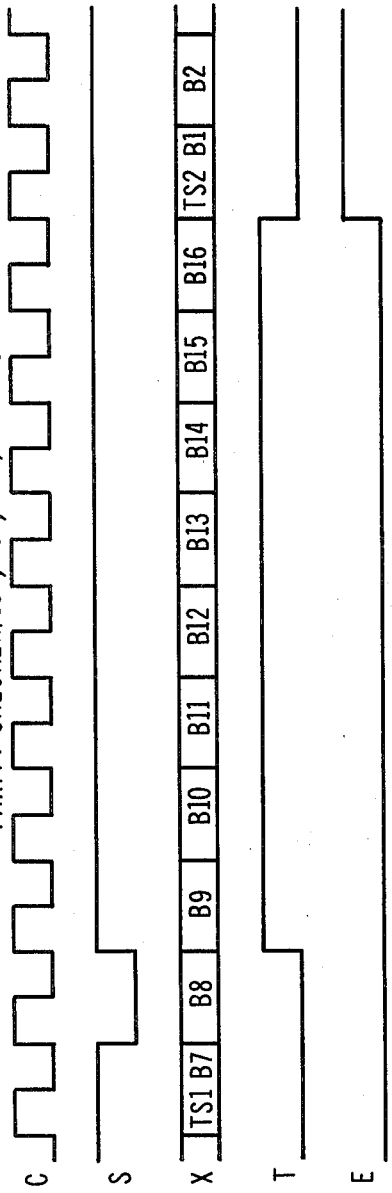
FIG. 11 PARITY CHECKER (132, 231, 303) TIMING
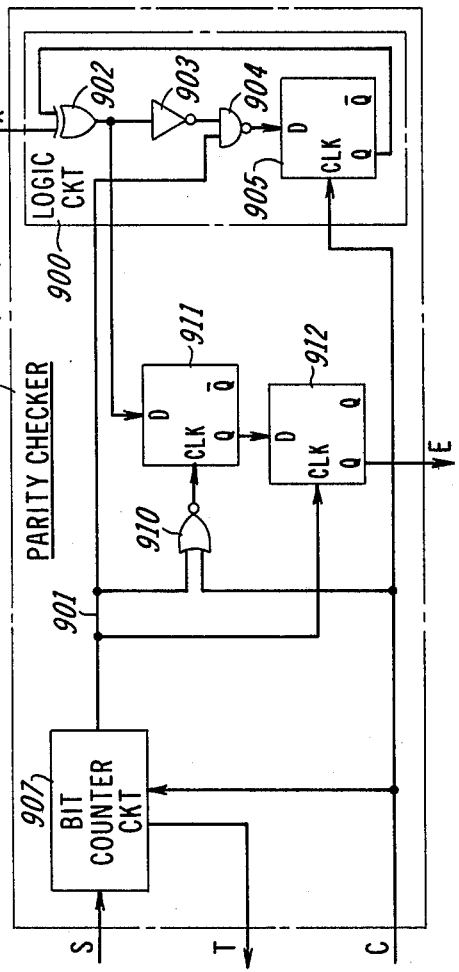
FIG. 12 (132, 231, 303)

FIG. 13

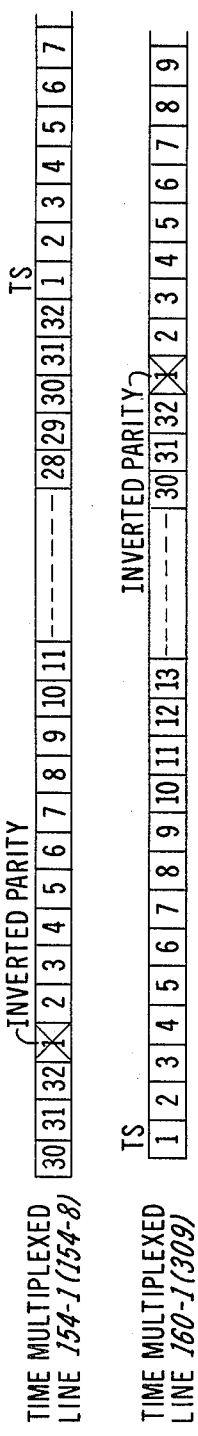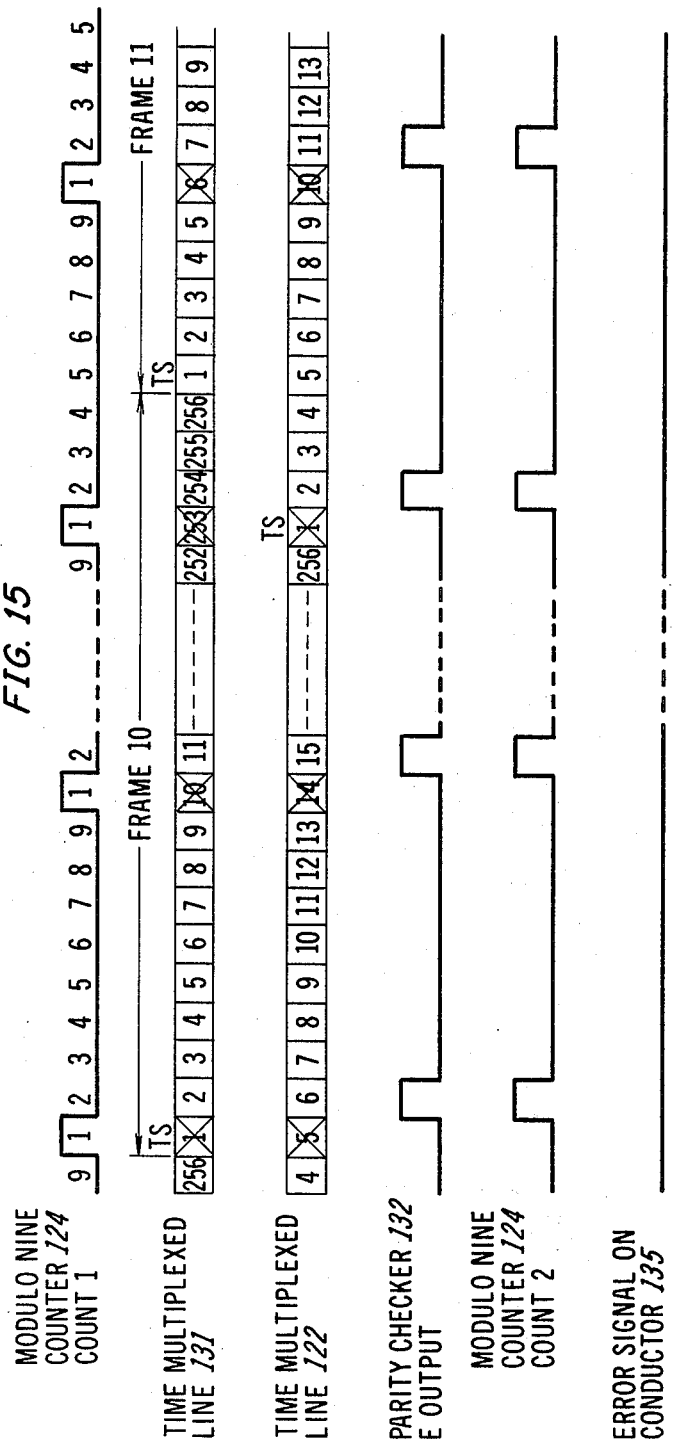
FIG. 14
FIG. 15

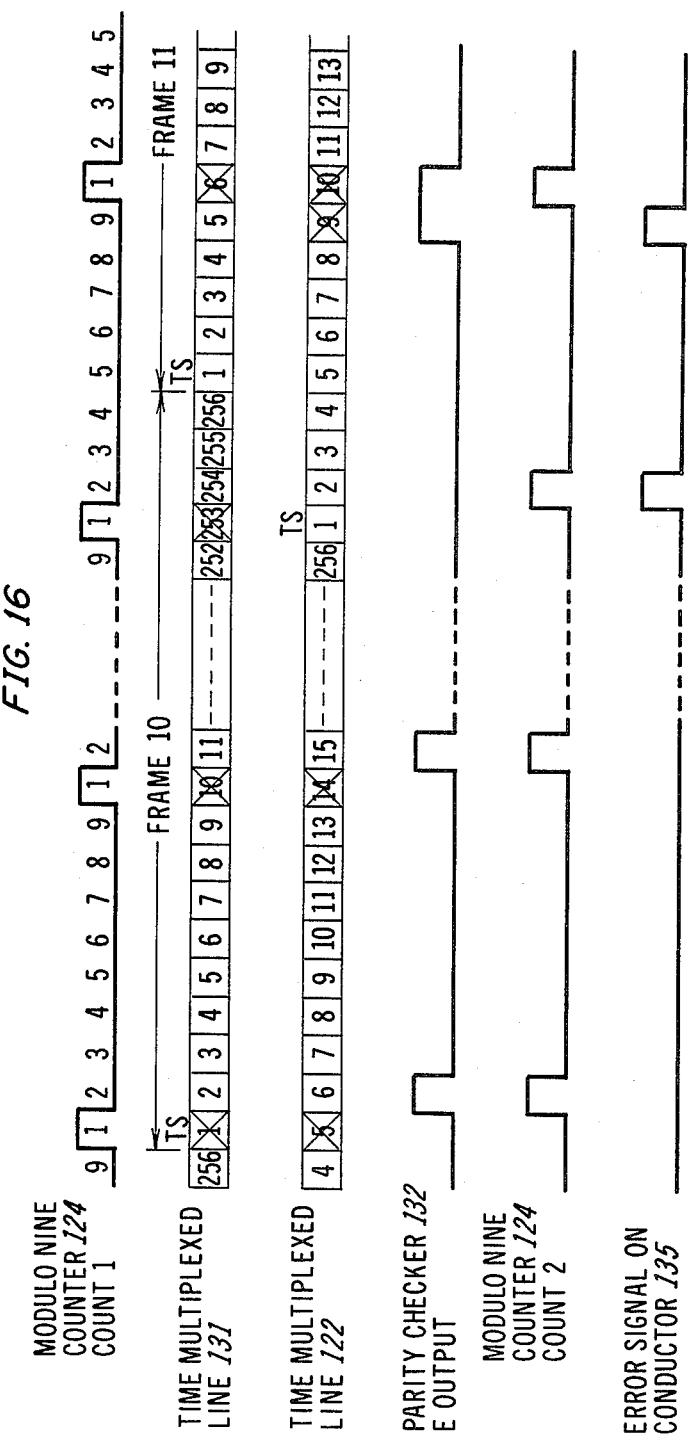

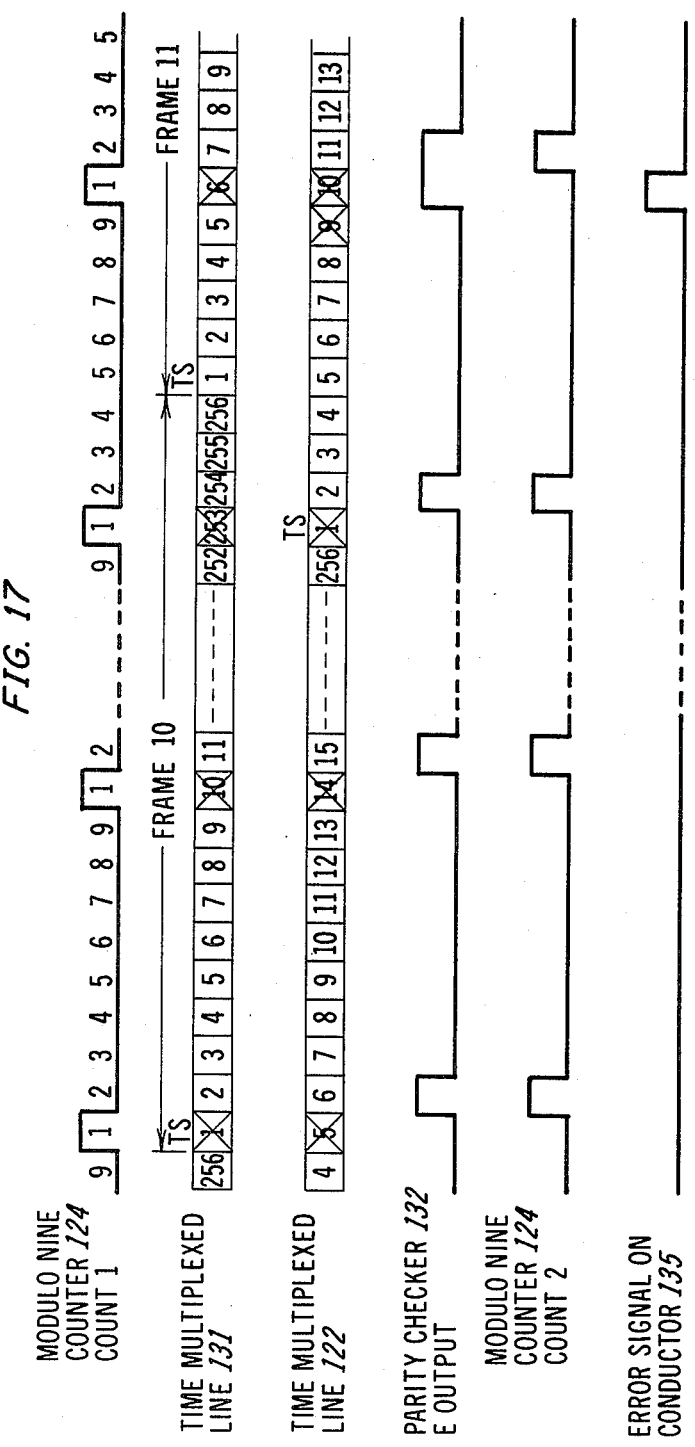

FAULT AND ERROR DETECTION ARRANGEMENT

TECHNICAL FIELD

This invention relates to fault and error detection arrangements and, more particularly, to such arrangements to be used within digital data systems.

BACKGROUND OF THE INVENTION

Digital data systems frequently include bidirectional interconnection arrangements for routing data words between various points within the system. Such routing arrangements may be complex time division switching systems or simple multiplexer/demultiplexer circuits. In order to assure reliable operation, misrouting of data words must be promptly detected so that remedial steps can be taken.

In accordance with one known arrangement for checking data word routing, a known test character is transmitted by a data transmitter under the control of a central control unit in the portion of selected idle channels which is normally used to transmit data. The central control unit also controls a receiver associated with each selected idle channel to return the information received in that idle channel in a particular channel conveyed back to the data transmitter. Circuitry associated with the data transmitter checks the particular channel for the return of the test character to determine whether correct routing has occurred. Only idle channels can be checked in accordance with the above arrangement and the existence of such idle channels cannot be predicted since they depend on actual usage of the data system. Accordingly, routing checks are infrequent and require many control unit operations to locate idle channels and to notify the data receivers and transmitters.

In accordance with a second known routing check arrangement, the parity bit associated with selected data words is inverted when transmitted by a data transmitter. The particular receiver which is to receive one of the selected data words is then notified by a central control unit to expect inverted parity for that selected data word. If the receiver detects inverted parity, routing is assumed to be correct while routing is assumed to be incorrect if noninverted parity is detected. This second data word routing check arrangement provides only unidirectional routing checks and as with the previous arrangement, requires considerable control unit interaction. The present invention is an arrangement for frequently and consistently checking data word routing in bidirectional digital data systems without adding undue complexity to those systems.

SUMMARY OF THE INVENTION

A circuit used in a fault and error detection arrangement in accordance with the present invention comprises a first data transmitter for transmitting data words including a parity bit in time-separated channels on a first time-multiplexed line, a parity checker for generating parity invert signals when the parity bit of a data word on the first time-multiplexed line is determined to be inverted, a second data transmitter for transmitting data words including a parity bit, and a parity inverter responsive to the parity invert signals for inverting the parity bit of a predetermined one of the data words transmitted by the second data transmitter.

The fault and error detection arrangement includes pluralities of the above-mentioned parity checkers, second data transmitters, and parity inverters and a connection arrangement which routes data words from the first data transmitter to the parity checkers and which routes data words from the second data transmitters to a plurality of time-separated channels on a second time-multiplexed line. A second parity checker, responsive to data words on the second time-multiplexed line, generates a signal when the parity bit of a given data word on the second time-multiplexed line is determined to be inverted. In one embodiment of the invention, an error signal generator generates an error signal indicative of anomalous operation when the signal generated by the second parity checker and an inverted parity expected signal generated by a sequence generator are not in agreement.

BRIEF DESCRIPTION OF THE DRAWING

A more complete understanding of the present invention may be obtained from a consideration of the following description when read in conjunction with the drawing in which:

FIGS. 3 through 7, when arranged in accordance with FIG. 8, present a more detailed diagram of portions of the system shown in FIG. 2;

FIGS. 11 and 12 are timing and circuit diagrams, respectively, pertinent to a parity checker used in the system shown in FIG. 2; and FIGS. 13 through 17 are timing diagrams illustrating various timing relationships within the system shown in FIG. 2.

DETAILED DESCRIPTION

Figure 1:
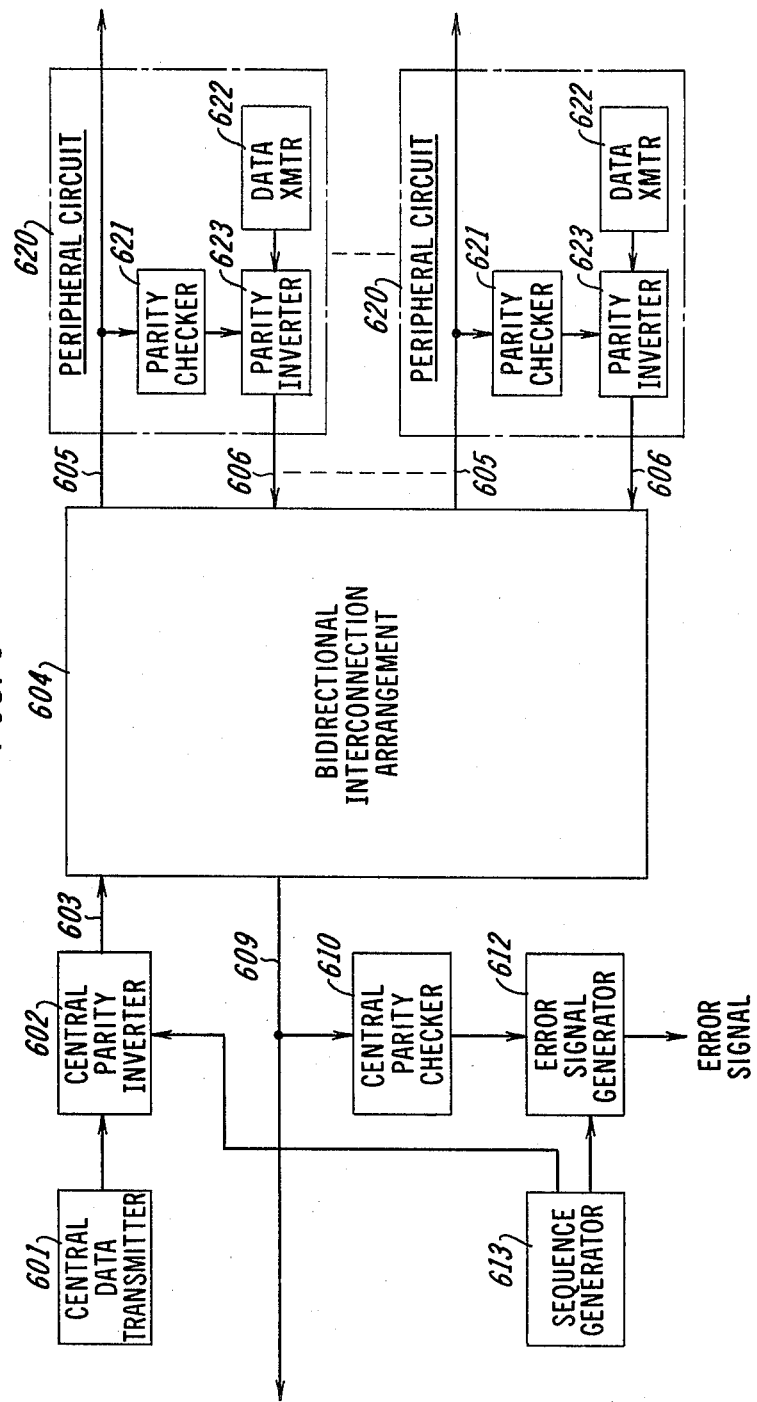
FIG. 1 is a block diagram of a digital data system illustrating the principles of the present invention.

FIG. 1 is a block diagram of a digital data system illustrating the principles of the present invention. In this system, data words transmitted by a central data transmitter 601 are distributed to 256 peripheral circuits 620 by a bidirectional interconnection arrangement 604. Interconnection arrangement 604 also multiplexes data words originating at each of the peripheral circuits 620 and transmits the multiplexed data words on a time-multiplexed line 609. Interconnection arrangement 604 may be implemented, for example, as several stages of multiplexer/demultiplexer circuits. The fault and error detection arrangement employed in this system in accordance with the present invention is capable of detecting routing errors made by interconnection arrangement 604.

Central data transmitter 601 transmits data words including a parity bit in 256 time-separated channels, which are assigned numerical designations from 1 through 256 in sequence as they occur. A central parity inverter 602 inverts the parity bit of every ninth data word in response to parity control signals transmitted by a sequence generator 613. The significance of the choice of every ninth data word for parity bit inversion is discussed later herein. The resulting data stream is transmitted to interconnection arrangement 604 on a 256-channel time-multiplexed line 603. Interconnection arrangement 604 routes data words from each of the channels on line 603 to a uniquely associated one of the peripheral circuits 620 via one of 256 conductors 605. Each peripheral circuit 620 comprises a parity checker 621, a data transmitter 622, and a parity inverter 623. Each parity checker 621 computes the parity of each data word transmitted on its associated conductor 605 and generates a parity invert signal when inverted parity is found. The parity inverter 623 of each peripheral circuit 620 responds to parity invert signals from its associated parity checker 621 by inverting the parity bit of the next data word transmitted by data transmitter 622. The data words are transmitted from each peripheral circuit 620 on a conductor 606 and are multiplexed and routed by interconnection arrangement 604 to a central parity checker 610 in a unique one of 256 time-separated channels on time-multiplexed line 609. Central parity checker 610 transmits a signal to an error signal generator 612 indicating whether inverted parity or noninverted parity is received. In accordance with the present example, the operation of interconnection arrangement 604 is symmetrical—i.e., if a given peripheral circuit 620 receives data from channel 5 on line 603, data transmitted from that peripheral circuit 620 will be transmitted in channel 5 on line 609. Since data words having inverted parity are transmitted during every ninth time slot on line 603, the return of data words with inverted parity is expected during every ninth time slot on line 609. A signal indicating the expected occurrence of inverted parity is transmitted to error signal generator 612 by sequence generator 613 during every ninth time slot on line 609. An error signal is generated by error signal generator 612 under either of the following conditions: (1) central parity checker 610 indicates that a data word having noninverted parity was received and sequence generator 613 indicates that an inverted parity data word was expected, or (2) central parity checker 610 indicates that a data word having inverted parity was received and sequence generator 613 indicates that a noninverted parity data word was expected.

In more general terms, an inverted parity data word can be transmitted during every Nth time slot, where N is any positive integer. To assure that every channel will be periodically used to transmit an inverted parity data word, N must have no factors in common with C, the total number of channels. For a given value of C, many values of N satisfy this criterion. The choice of a particular N is based in part upon the desired time interval between inverted parity data words in each channel. Table 1 lists for the present example those time slots during which an inverted parity data word is transmitted. In this example, the choice N=9 results in an inverted parity data word being transmitted in each time slot (channel) once every nine frames.

TABLE 1

| Frame | Sequence of Inverted Parity Time Slots | | | | | | | |
|---|---|---|---|---|---|---|---|---|
| 1 | 1, | 10, | 19, | 28, | . | . | 244, | 253 |
| 2 | 6, | 15, | 24, | 33, | . | . | 249 | |
| 3 | 2, | 11, | 20, | 29, | . | . | 245, | 254 |
| 4 | 7, | 16, | 25, | 34, | . | . | 250 | |
| 5 | 3, | 12, | 21, | 30, | . | . | 246, | 255 |
| 6 | 8, | 17, | 26, | 35, | . | . | 251 | |
| 7 | 4, | 13, | 22, | 31, | . | . | 247, | 256 |
| 8 | 9, | 18, | 27, | 36, | . | . | 252 | |
| 9 | 5, | 14, | 23, | 32, | . | . | 248 | |
| 10 | 1, | 10, | 19, | 28, | . | . | 244, | 253 |
| 11 | 6, | 15, | 24, | 33, | . | . | 249 | |

TABLE 1-continued

| Frame | Sequence of Inverted Parity Time Slots |
|---|---|

Figure 2:
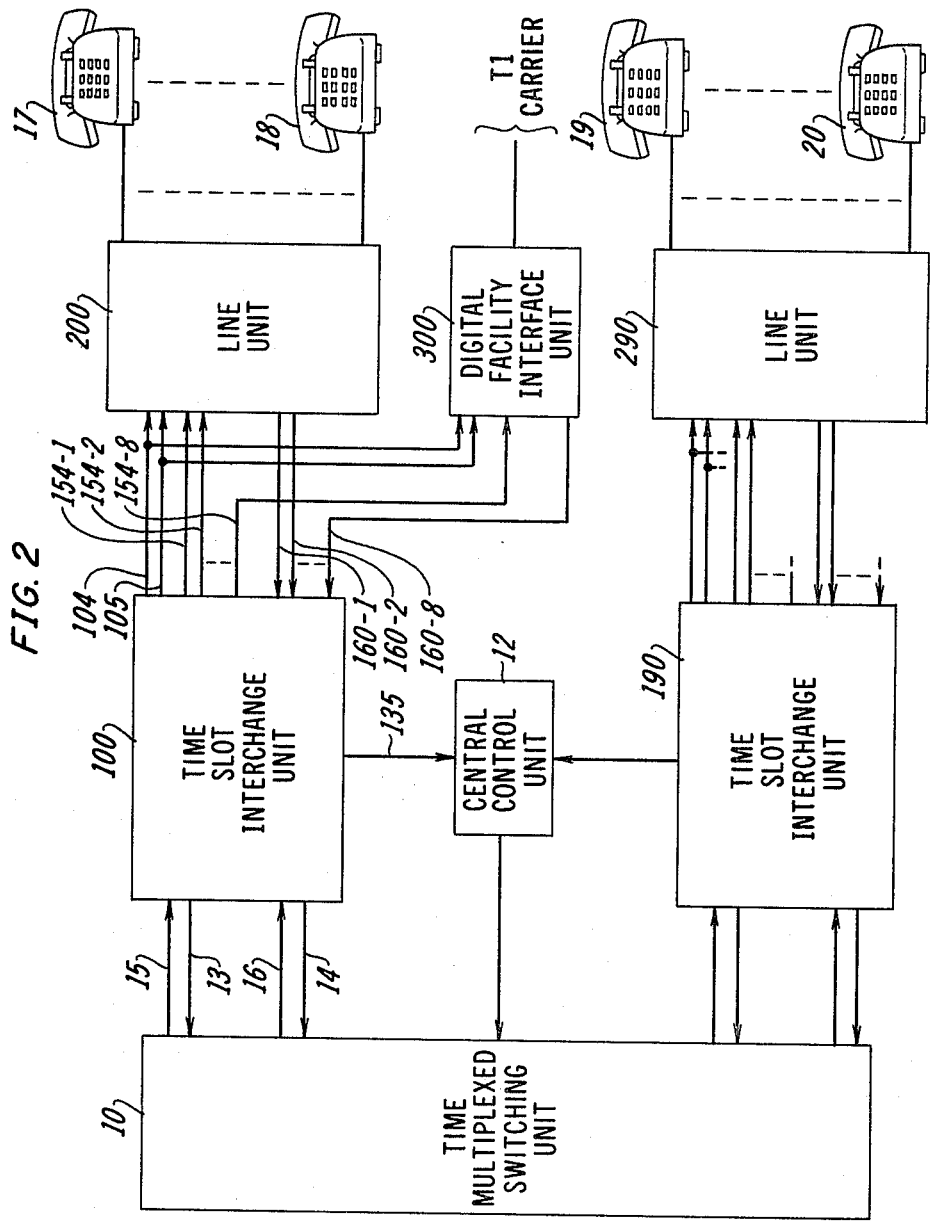
FIG. 2 is a block diagram of a time division switching system employing the present invention.
Figure 3:
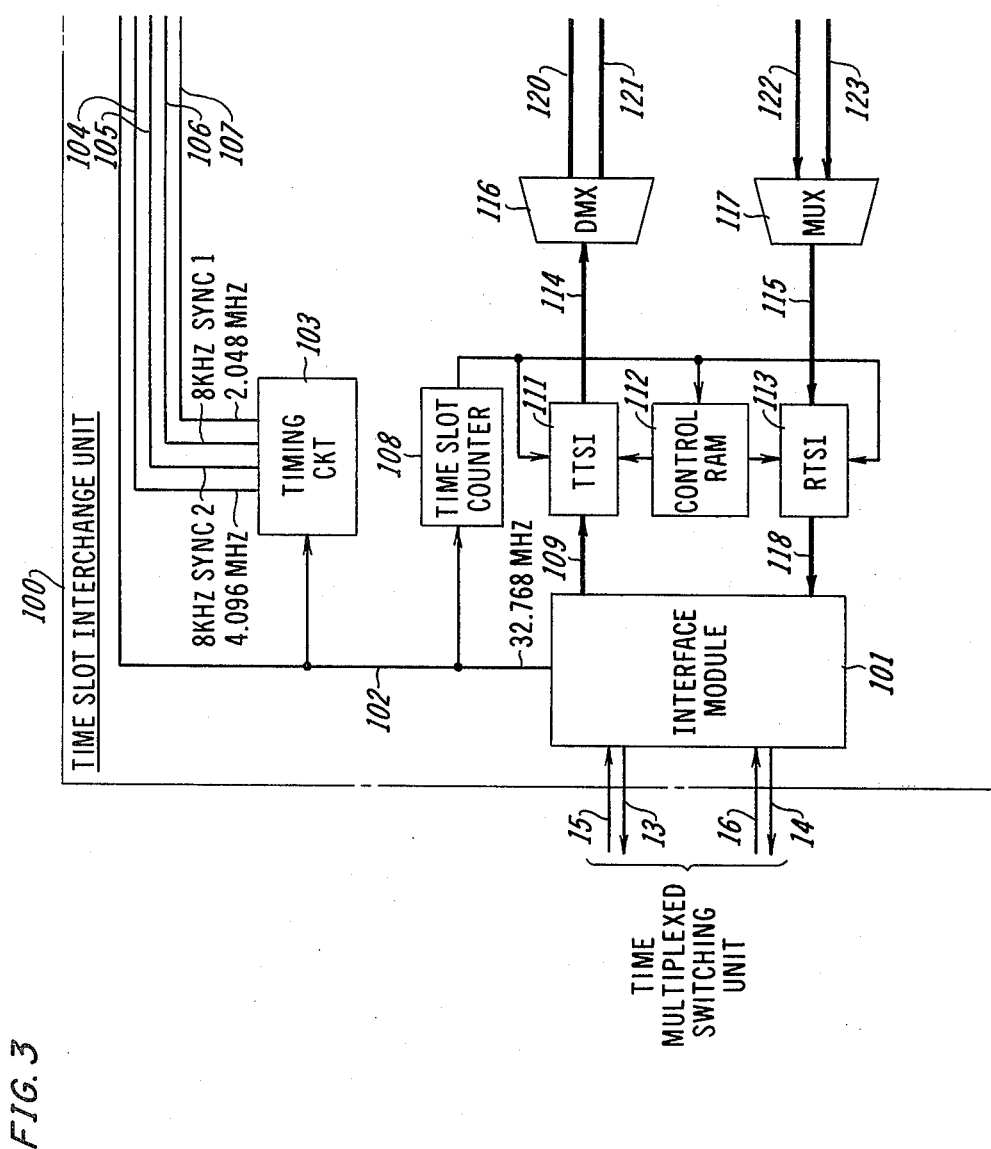

FIG. 2 is a block diagram of a time division switching system employing the present invention. This system includes a central control unit 12, a time-multiplexed switching unit 10 comprising a time-shared space division switch, and two time-slot interchange units 100 and 190, each including a bidirectional time-slot interchange. Each time-slot interchange unit 100 and 190 is capable of distributing 16-bit data words to eight 32-channel time-multiplexed lines 154 and multiplexing 16-bit data words received on eight 32-channel time-multiplexed lines 160. Data words are transmitted on each of the lines 154 and 160 at a bit rate of 4.096 megahertz in 125-microsecond frames each comprising 32 time slots. In the system shown, time-slot interchange unit 100 is associated with a line unit 200, which performs the distribution, multiplexing, and digital-to-analog and analog-to-digital conversion required to interface with 64 subscriber sets, of which sets 17 and 18 are specifically shown. Time-slot interchange unit 100 is also associated with a digital facility interface unit 300 used to access a T1 digital carrier system. Similarly, time-slot interchange unit 190 is associated with a line unit 290 interfacing 64 subscriber sets, sets 19 and 20 being shown. It should be noted that time-slot interchange units 100 and 190 are each capable of routing information to and from time-multiplexed switching unit 10 in 512 channels. Only a fraction of this capacity is used in the example system in order to aid the understanding of the invention.

To establish communication through the switching system of FIG. 2, a calling subscriber set, e.g., 17, transmits to central control unit 12 calling signals defining a called subscriber set, e.g., 20. Based on these calling signals, central control unit 12 assigns an available time slot (channel) and path through time-multiplexed switching unit 10 to the call. The analog speech signal originating at subscriber set 17 is transmitted to line unit 200 where it is sampled at a rate of 8000 samples per second. The samples are encoded into digital data words which are routed to time-slot interchange unit 100 in a particular channel associated with subscriber set 17. Time-slot interchange unit 100 transmits each of the data words received in that particular channel to time-multiplexed switching unit 10 during the time slot assigned to the call and the data words are conveyed through time-multiplexed switching unit 10 via the assigned path to time-slot interchange unit 190. Time-slot interchange unit 190 transmits the data words representing speech signals from subscriber set 17 to line unit 290 in a channel associated with subscriber set 20. Line unit 290 decodes the data words into speech samples and reconstructs the analog speech signal for transmission to subscriber set 20. The speech signal originating at subscriber set 20 is communicated to subscriber set 17 in like manner.

A fault and error detection arrangement embodying the present invention is used in this system to detect errors made by time-slot interchange unit 100 in distributing data words to the time-multiplexed lines 154 and in multiplexing data words received on time-multiplexed lines 160 as well as similar distribution and multiplexing errors made within line unit 200. The arrangement is also used to detect transmission errors affecting the fidelity of the data. Only those aspects of the time division switching system relevant to the present invention are described herein; a more complete description of system operation may be found in the application E. H. Hafer et al., application Ser. No. 106,392, filed Dec. 26, 1979, which is assigned to the assignee of the present application.

FIGS. 3 through 7, when arranged in accordance with FIG. 8, show time-slot interchange unit 100, line unit 200, and digital facility interface unit 300 in greater detail. Time-multiplexed switching unit 10 transmits 16-bit data words comprising a 15-bit data portion and a single parity bit to time-slot interchange unit 100 on two time-multiplexed lines 15 and 16. Each time-multiplexed line 15 and 16 conveys digital information in 125-microsecond frames comprising 256 time-separated channels at a bit rate of 32.768 megahertz. The data words on lines 15 and 16 occupy time slots of approximately 488 nanoseconds duration. An interface module 101 receives the incoming data words and recovers a 32.768-megahertz clock signal upon which the timing of the system is based. The 32.768-megahertz clock signal is transmitted on a conductor 102 to a timing circuit 103, which develops additional, integrally-related timing signals by well-known means.

Interface module 101 transmits the data words received on lines 15 and 16 to a transmit time-slot interchange 111 via a 512-channel time-multiplexed line 109. The data words received by transmit time-slot interchange 111 must be placed in time slots that are properly sequenced for routing to the 64 subscriber sets and digital facility interface unit 300. Transmit time-slot interchange 111, operated in conjunction with a control random access memory 112 and a time-slot counter 108, performs the time-slot interchange function in a manner described in the above-cited application E. H. Hafer et al. The appropriately rearranged data words are transmitted to a demultiplexer 116 on a 512-channel time-multiplexed line 114. Although the time-slot interchange function is performed on a 512-channel basis, the other functions of time-slot interchange unit 100 are accomplished by operating on two 256-channel frames. Demultiplexer 116 splits the information on line 114 by transmitting data words alternately on two 256-channel time-multiplexed lines 120 and 121. For each of the lines 120 and 121, the channels are assigned numerical designations from 1 through 256 in sequence as they occur. A parity generator 130, which is a part of an error detector 126, receives the data words on line 120 at an input terminal X and derives a new parity bit from the data portion of each data word received. Parity generator 130 then transmits from an output terminal Y a new data word comprising the received data portion and the new parity bit to a data interface 140 via a 256-channel time-multiplexed line 131. The data words transmitted by demultiplexer 116 on line 121 are routed via an error detector 127 and a data interface 141, which are substantially similar to error detector 126 and data interface 140, respectively. Accordingly, the operation of error detector 127 and data interface 141 is not described in detail herein.

Parity generator 130 normally derives the new parity bit such that the new data word transmitted has an odd number of ones. The data words thus transmitted are referred to as having odd parity. However, during every ninth time slot parity generator 130 transmits a data word having even parity. This, in effect, marks every ninth data word so that its proper routing through the system can be checked. The even or odd parity characteristic of a data word is referred to as the parity sense of the data word.

Figure 4:
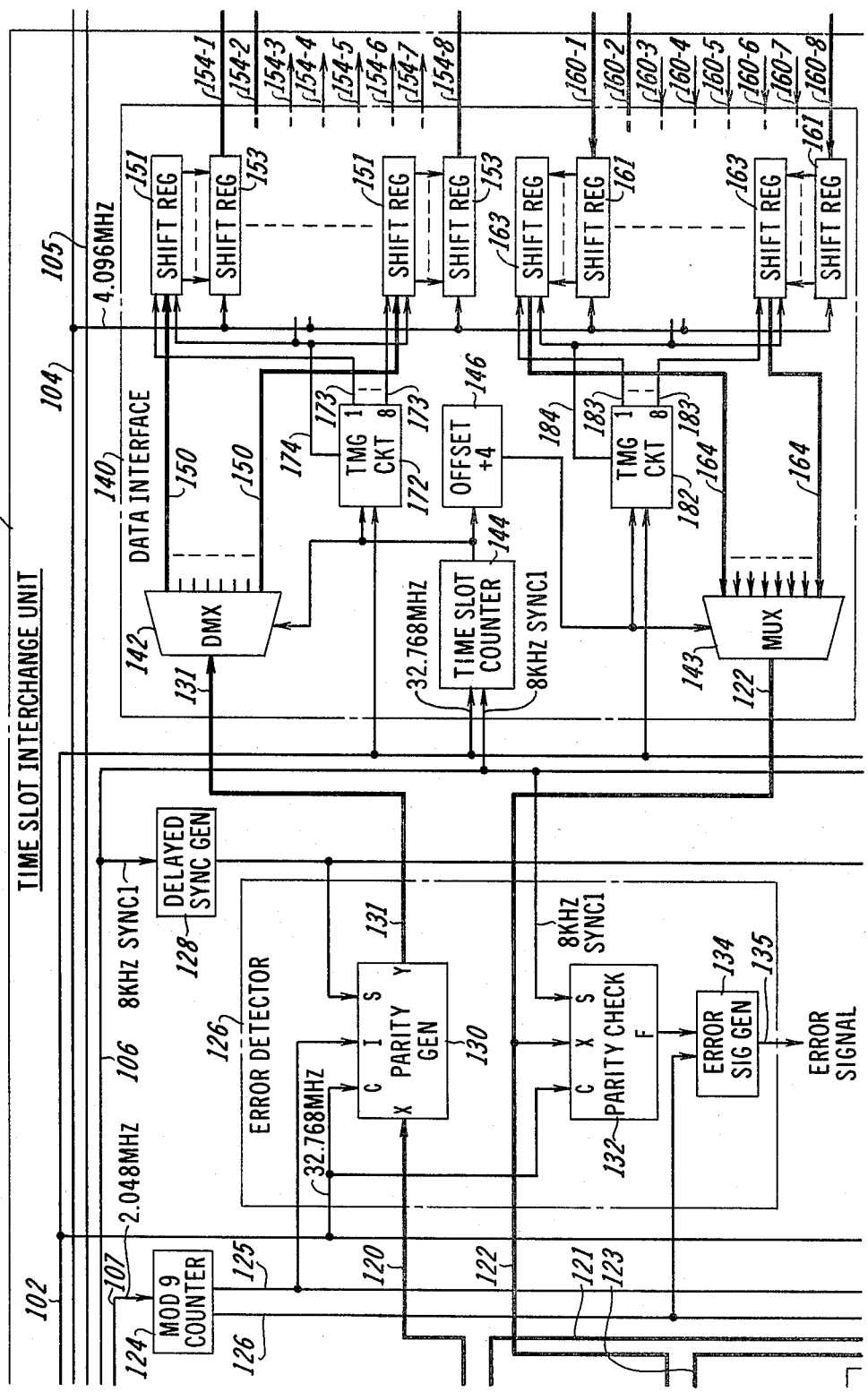
Figure 5:
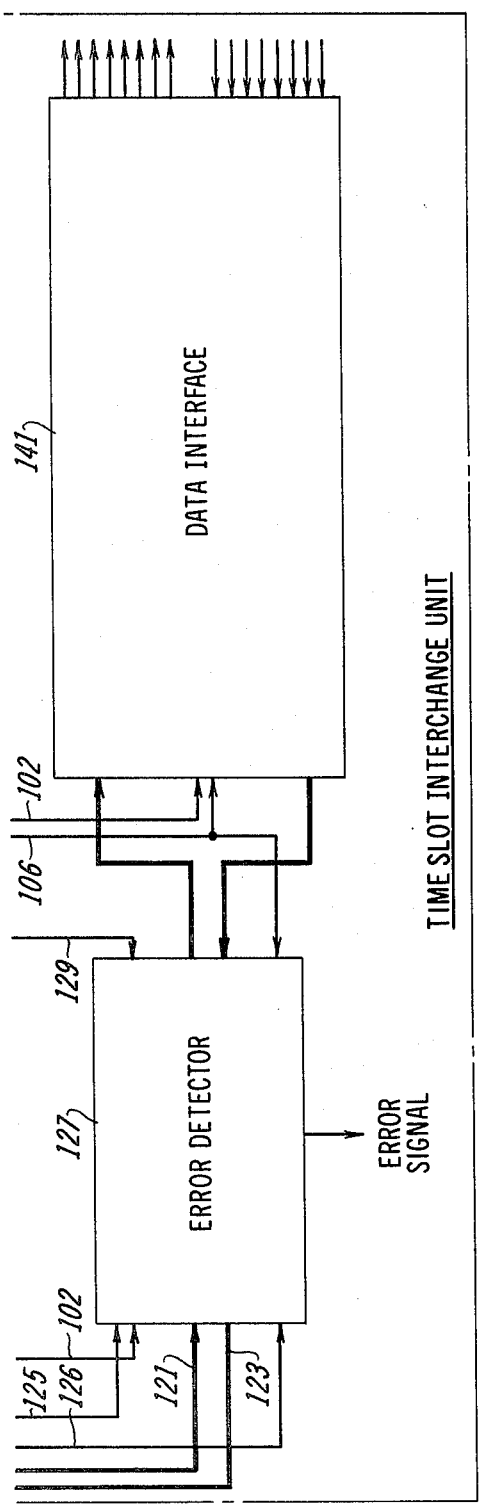
Figure 6:
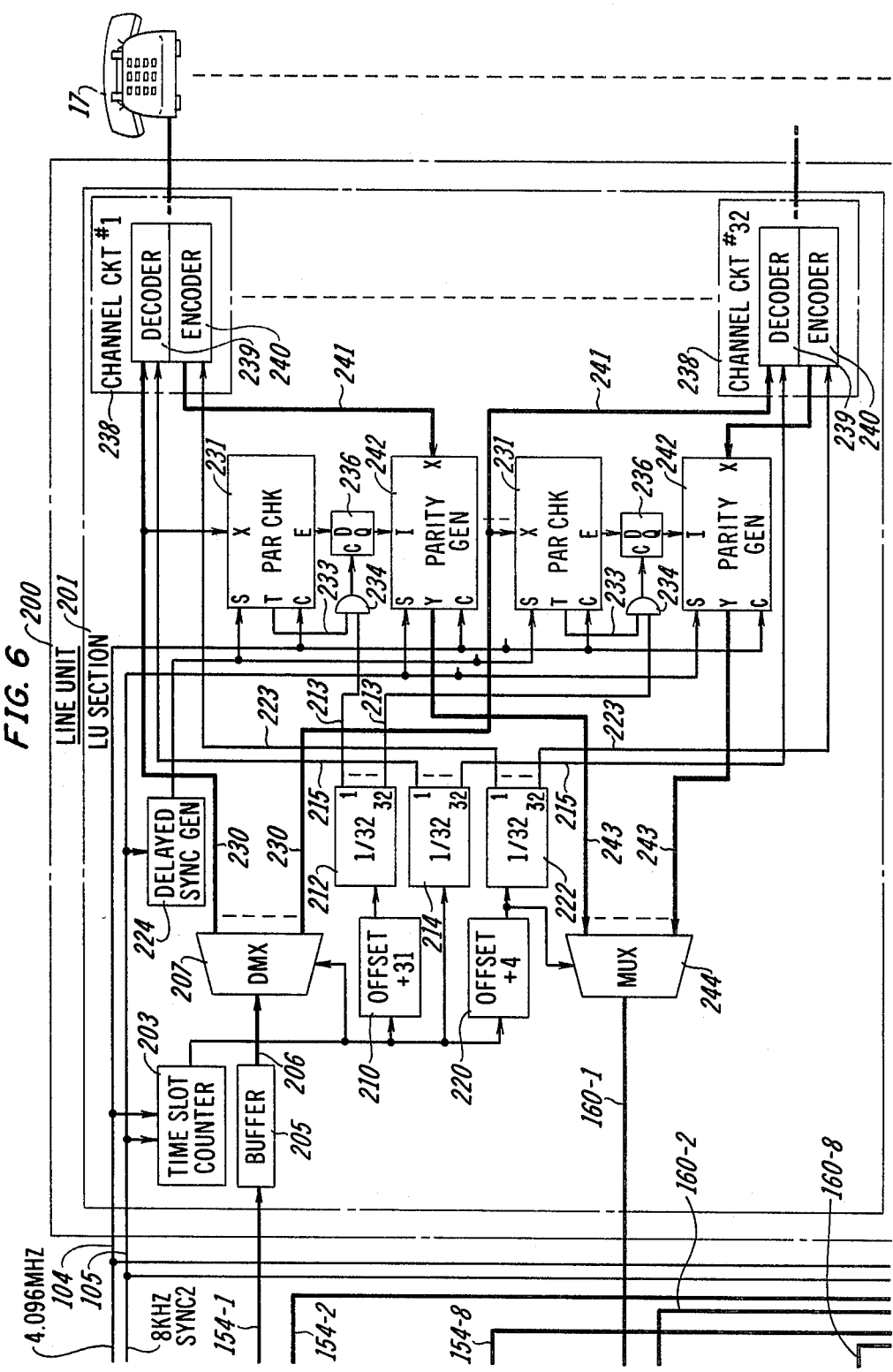
Figure 9:
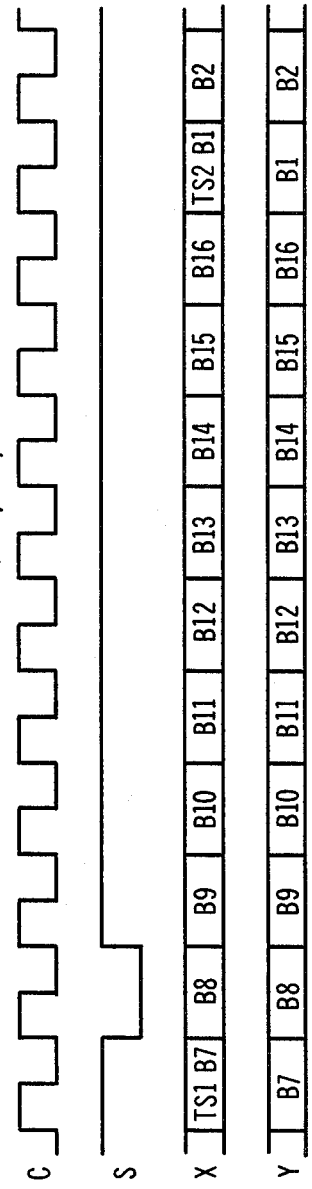
FIGS. 9 and 10 are timing and circuit diagrams, respectively, pertinent to a parity generator used in the system shown in FIG. 2.
Figure 10:
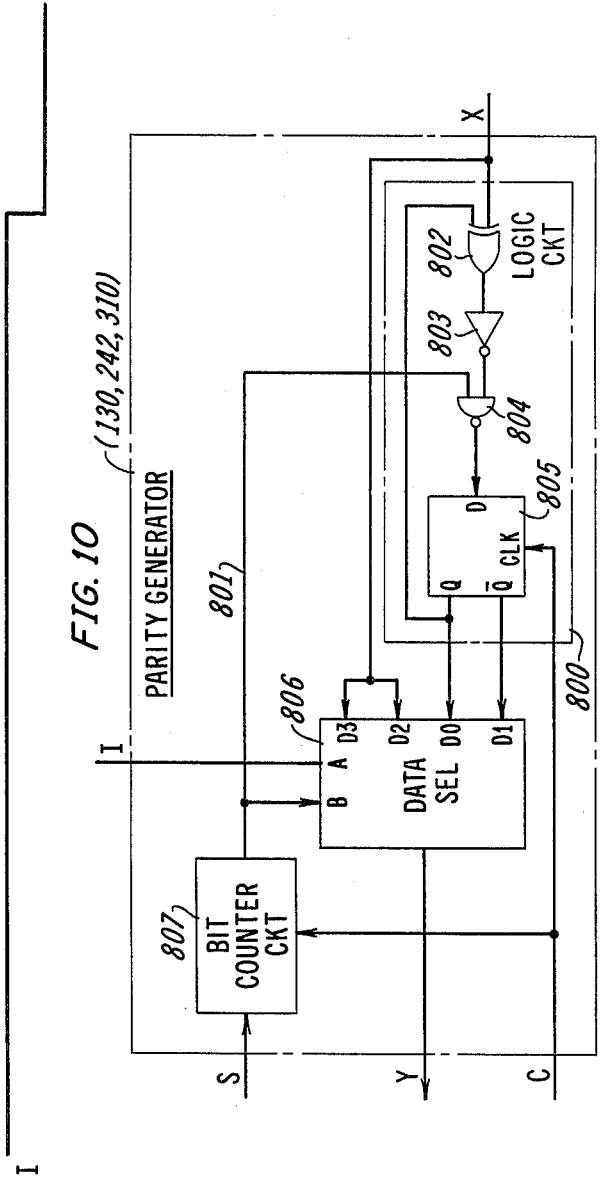

FIG. 10 is a more detailed diagram of parity generator 130. The 32.768-megahertz clock signal generated by interface module 101 is received at a terminal C of parity generator 130. This 32.768-megahertz clock signal is in substantial synchronism with the data word bits received at terminal X as shown in FIG. 9. A bit counter 807 (FIG. 10) receives the 32.768-megahertz clock signal from terminal C, counts the pulses in that clock signal, and generates an output signal on conductor 801 which remains high during bits 1 through 15 of each data word received at terminal X and goes low during bit 16. The output signal on conductor 801 is connected to a select input B of a data selector 806. Data selector 806 also receives at a select input A a parity control signal generated by a modulo-nine counter 124 (FIG. 4). Modulo-nine counter 124 receives on a conductor 107 a 2.048-megahertz time-slot clock signal which is derived by timing circuit 103 from the basic 32.768-megahertz clock signal. It should be noted that in the present example, the 2.048-megahertz clock signal comprises one pulse per time slot. Modulo-nine counter 124 repetitively counts time slots from one to nine and transmits a high signal, referred to as an inverted parity transmit signal, to an I terminal of parity generator 130 on a conductor 125 during each time slot that modulo-nine counter 124 is on count 1. During all other time slots, a low signal is generated by modulo-nine counter 124. The I terminal of parity generator 130 is connected to select input A of data selector 806 (FIG. 10). As is shown in Table 2, data selector 806 selects the one of four data inputs, D0 through D3, corresponding to the two control bits presented at select inputs A and B.

TABLE 2

| Select Input B | Select Input A | Selected Data Input (Source) |
| --- | --- | --- |
| low | low | D0 (Q) |
| low | high | D1 ($\overline{Q}$) |
| high | low | D2 (data bit) |
| high | high | D3 (data bit) |

Data input D2 and D3 are connected directly to input terminal X. Because select input B is high during bits 1 through 15 of each data word received at input terminal X, those bits are transmitted directly through data selector 806 to output terminal Y. A new parity bit is computed by a logic circuit 800 having an exclusive OR gate 802, an inverter 803, a NAND gate 804, and a D-type flip-flop 805. Data inputs D0 and D1 of data selector 806 are connected to the Q and $\overline{Q}$ outputs, respectively, of flip-flop 805. The output Q is the parity bit (odd parity sense) computed for the 15 data bits received at terminal X, while output $\overline{Q}$ is the inverted parity bit (even parity sense). Since select input B is low during bit 16 (see Table 2), either the Q or $\overline{Q}$ output will be transmitted to output terminal Y as the new parity bit. During every ninth time slot, select input A is high and the inverted parity bit $\overline{Q}$ connected to data input D1 is selected during bit 16. Accordingly, an even parity data word is transmitted. During the other time slots, select input A is low, the parity bit Q connected to data input D0 is selected during bit 16, and an odd parity data word is transmitted. The low output generated by bit counter 800 during bit 16 is also used to initialize logic circuit 800 such that the parity bit for the next data word received may be properly computed. Additionally, parity generator 130 receives an 8-kilohertz synchronizing pulse transmitted by a delayed sync generator 128 at a terminal S. The 8-kilohertz synchronizing pulse is used to synchronize the operation of bit counter 807 with the data stream received at terminal X. This 8-kilohertz synchronizing pulse, which is one 32.768-megahertz clock cycle in width, occurs during time slot 1, bit 8 on line 120 and is a delayed version of an 8-kilohertz synchronizing pulse transmitted by timing circuit 103 on conductor 106. Table 1 lists the time slots during which an even (inverted) parity data word is transmitted for 11 consecutive frames. An even parity data word is transmitted in each time slot (channel) once every nine frames or 1.125 milliseconds.

The 256-channel frames transmitted by parity generator 130 on line 131 are distributed by data interface 140 to the eight 32-channel time-multiplexed lines 154 in groups of eight channels (FIG. 4). The 256 channels are grouped as follows: channels 1–8, 9–16, 17–24, . . . , 249–256. Each channel within a group of eight is uniquely associated with one of the lines 154. The eight lines 154 are designated 154-1 through 154-8. In accordance with the present example, each channel in a group is uniquely associated with the one of the lines 154-1 through 154-8 having the same last numeral as the position of that channel within the group. A time-slot counter 144 receives the 32.768-megahertz clock on conductor 102 and the 8-kilohertz synchronizing pulse on conductor 106 and generates a recurring sequence of eight address designations at the rate of one address designation per 488-nanosecond time slot. The particular address designation generated during the time slot in which a given data word of a group of eight words is received is transmitted to a demultiplexer 142 and a timing circuit 172. Demultiplexer 142 transmits the given word on the one of eight conductors 150 that is defined by the particular address designation to a 16-bit shift register 151 associated with that conductor 150. Timing circuit 172, which includes a 1-out-of-8 decoder, receives the 32.768-megahertz clock signal on conductor 102 and, in response to the address designation, selectively transmits that clock signal via one of eight conductors 173 to clock the bits of the given word into the designated one of the shift registers 151. When all eight data words of a group have been received, the contents of each shift register 151 are transmitted in parallel to an associated 16-bit shift register 153. The contents of all eight shift registers 151 are transmitted substantially simultaneously in response to a pulse generated on a conductor 174 by timing circuit 172 after the last word of each 8-word group is received by its associated shift register 151. The eight shift registers 153 also receive a 4.096-megahertz clock signal transmitted by timing circuit 103 on a conductor 104 and transmit their contents serially at a 4.096-megahertz rate on the eight 32-channel time-multiplexed lines 154. While the contents of shift registers 153 are being shifted out, the next group of eight data words is being transmitted by demultiplexer 142 to shift registers 151.

Figure 13:
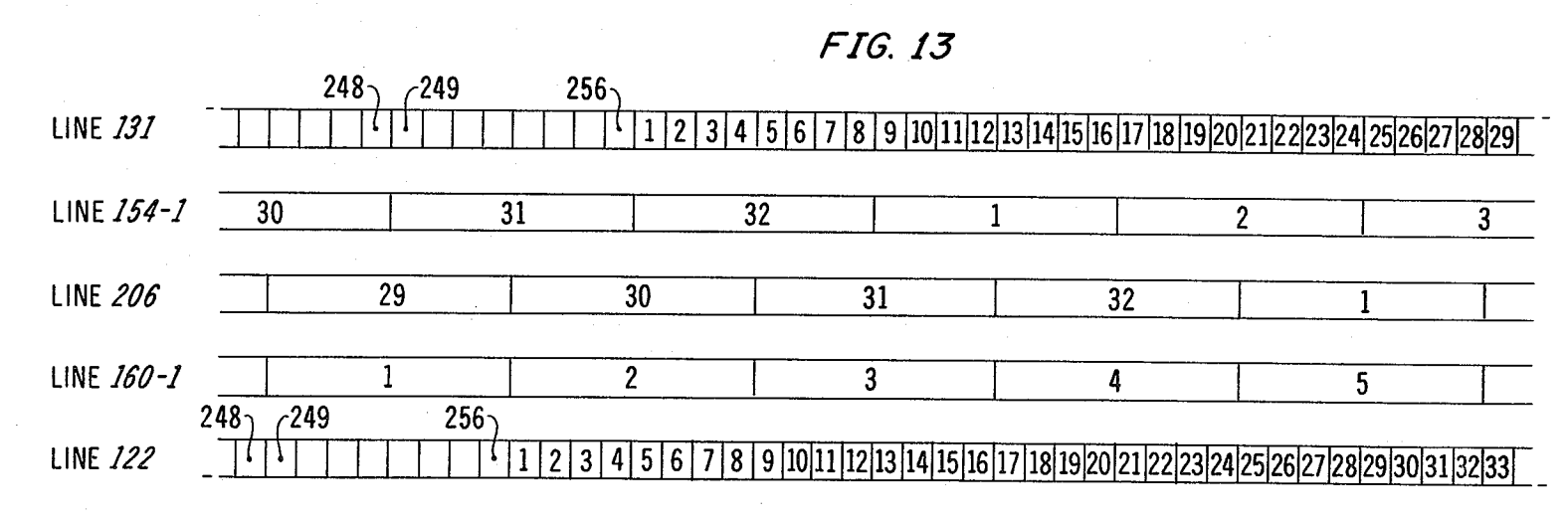

The data words on lines 154 occupy time slots of approximately 3.906 microseconds duration. For each of the lines 154, the channels are assigned numerical designations from 1 through 32 in time sequence and are referred to as destination channels since the data words routed in 32 of the 256 channels on line 131 have as their destination a particular channel on one of the lines 154. The timing relationship between the 488-nanosecond time slots on 256-channel time-multiplexed line 131 and the 3.906-microsecond time slot on 32-channel time multiplexed line 154-1 is shown in FIG. 13. In the system being described, only three of the eight lines 154 are in use, lines 154-1 and 154-2 being used to transmit data to line unit 200 and line 154-8 to transmit data to digital facility interface unit 300. An idle code is transmitted on lines 154-3 through 154-7.

Line unit 200 comprises two substantially identical sections 201 and 202 of which only section 201 is described herein. A buffer 205 receives the incoming data on time-multiplexed line 154-1 and, after a delay of 1½ time slots, transmits it to a demultiplexer 207 via a time-multiplexed line 206. The timing relationship between lines 154-1 and 206 is shown in FIG. 13. It should be noted that the particular timing relationships present in the example system were determined to accommodate the chosen implementation of the time-slot interchange function. Different timing relationships, which may be chosen for other systems, can be easily accommodated as is described later herein. The 4.096-megahertz clock signal on conductor 104 and an 8-kilohertz synchronizing pulse transmitted by timing circuit 103 on a conductor 105 are received by a time-slot counter 203 and used to generate a recurring sequence of 32 time-slot designations at the rate of one time-slot designation per 3.906-microsecond time slot. Each of the 32 channels transmitted on line 206 is uniquely associated with one of 32 channel circuits 238. The particular time-slot designation generated by time-slot counter 203 during the time slot a given data word is received is transmitted to demultiplexer 207 and defines the particular one of the 32 channels circuits 238 to which that data word is routed.

Each channel circuit 238 comprises a decoder section 239 and an encoder section 240 which provide interfaces to the analog environment of subscriber sets. The data words in a given one of the 32 channels on line 206 are transmitted to the decoder section 239 associated with the given channel on one of 32 conductors 230. A first 1-out-of-32 decoder 214 receives each time-slot designation from time-slot counter 203 and transmits a signal via one of 32 conductors 215 to the decoder section 239 associated with that designation. This signal is used to enable the particular decoder section 239 to receive a data word. Decoder sections 239 decode the data words received into analog samples and reconstruct speech signals to be transmitted to subscriber sets.

Each data word routed to a particular decoder section 239 is also transmitted to an input terminal X of an associated parity checker 231, shown in more detail in FIG. 12. The 4.096-megahertz clock generated by timing circuit 103 is received at a terminal C of parity checker 231. This 4.096-megahertz clock signal is in substantial synchronism with the data word bits received at terminal X as shown in FIG. 11. A logic circuit 900 (FIG. 12) and a bit counter 907 are similar to logic circuit 800 and bit counter 807 in parity generator 130 shown in FIG. 10. Logic circuit 900 comprises an exclusive OR gate 902, an inverter 903, a NAND gate 904, and a D-type flip-flop 905. The presence of a high signal at the output of exclusive OR gate 902 during bit 16 of a given data word received at terminal X indicates that the given data word has even (inverted) parity; a low signal during bit 16 indicates the receipt of an odd (noninverted) parity data word. Bit counter circuit 907 receives the 4.096-megahertz clock signal at terminal C and generates a low-going pulse on conductor 901 during every occurrence of bit 16 at terminal X. This low-going pulse on conductor 901 and the 4.096-megahertz clock signal at terminal C are the two input signals transmitted to a NOR gate 910. These input signals are both low only during the second half of bit 16 of each data word. Therefore, the output signal transmitted by NOR gate 910 is a high-going pulse, occurring once per time slot during the second half of bit 16. The positive-going edge of this pulse is used to store the signal generated by exclusive OR gate 902 in a D-type flip-flop 911. The positive-going edge of the pulse on conductor 901 occurs at the end of bit 16 and is used to store the output signal generated by flip-flop 911 in another D-type flip-flop 912. Flip-flops 911 and 912 are clocked only once per time slot. Therefore, the output signal generated by flip-flop 912, which is connected to an error terminal E, is high for the full duration of the next time slot after the receipt of an even (inverted) parity data word at terminal X. When an odd (noninverted) parity data word is received at terminal X, flip-flop 912 generates a low signal at its output for the full duration of the next time slot.

The low-going pulse generated by bit counter 907 on conductor 901 is also used to initialize logic circuit 900 such that the parity sense of the next data word received may be properly determined. Additionally, parity checker 231 receives at a terminal S an 8-kilohertz synchronizing pulse transmitted by a delayed sync generator 224 (FIG. 11). The 8-kilohertz synchronizing pulse is used to synchronize the operation of bit counter 907 with the data stream received at terminal X. This 8-kilohertz synchronizing pulse, which is one 4.096-megahertz clock cycle in width, occurs during time slot 1, bit 8 on line 206 and is a delayed version of the 8-kilohertz synchronizing pulse on conductor 105. Bit counter 907 also generates a time-slot clock signal at terminal T which is low during bits 1 through 8 of each time slot and high during bits 9 through 16. In this application, each parity checker 231 receives a data word from demultiplexer 207 during only one time slot of each 32 time-slot frame. During the other time slots is receives logic zero.

The output signal generated by parity checker 231 at terminal E (FIG. 4) defines the parity sense of the data word just received by that parity checker 231. When an even (inverted) parity data word is detected by parity checker 231, the signal at terminal E is high during the immediately following time slot. A high signal at terminal E is referred to as a parity invert signal. Alternatively, the signal at terminal E is low during the time slot immediately following the detection of an odd (noninverted) parity data word by parity checker 231. The signal at terminal E could change as frequently as once per time slot if a continuous stream of data words were received by parity checker 231. However, parity checker 231 receives only one data word per frame due to the operation of demultiplexer 207. Therefore, a D-type flip-flop 236 is used to select the proper E output signal.

Flip-flop 236 receives the signal at terminal E of parity checker 231 and stores that signal during the next time slot. The output of flip-flop 236 then remains unchanged until the process is repeated during the next fame. Flip-flop 236 stores the signal at terminal E in response to a control signal which is generated once per frame by an AND gate 234. AND gate 234 receives as input signals the signal at terminal T of parity checker 231 which defines the last eight bit positions of each time slot and a selection signal transmitted by a second 1-out-of-32 decoder 212 which defines the time slot immediately following the time slot during which a change in the signal at terminal E is possible. Decoder 212, operating in conjunction with an offset circuit 210, generates the selection signals applied to AND gte 234. Offset circuit 210 performs the modulo-32 addition of 31 to the time-slot designation generated by time-slot counter 203 and the resulting designation is transmitted to decoder 212. A high signal is transmitted from decoder 212 on one of 32 conductors 213 to the particular AND gate 234 associated with the resulting time-slot designation and defines the time slot immediately following the time slot during which the parity checker 231 associated with that AND gate 234 received a data word. Since the clock output at terminal T makes the transition from low to high at the beginning of bit 9, flip-flop 236 is not clocked until the midpoint of the next time slot. This assures that the signal at terminal E of parity checker 231 has stabilized before being stored in flip-flop 236. The output of flip-flop 236 is used to control an associated parity generator 242 as is described later herein.

The encoder section 240 of a particular channel circuit 238 is enabled to transmit a data word a time period equal to 28 time slots after the decoder section 239 of that channel circuit 238 is enabled. An offset circuit 220 performs the modulo-32 addition of four to the time-slot designation generated by time-slot counter 203 and the resulting designation is transmitted to a third 1-out-of-32 decoder 222. Decoder 222 transmits a high signal on one of 32 conductors 223 to enable the designated encoder section 240. For example, the decoder section 239 associated with channel 1 on line 206 will be enabled at the same time as the encoder section 240 associated with channel 5. Further, the encoder section 240 associated with channel 1 will be enabled 28 time slots later at the same time as the decoder section 239 associated with channel 29.

During the time slot that a particular encoder section 240 is enabled, a data word representing the next sampled output of a subscriber set is transmitted to associated parity generator 242 on a conductor 241. Logic zero is present on conductor 241 during the other time slots. Parity generator 242 is substantially identical to parity generator 130 and is not separately described herein. It will be remembered that the parity sense of each data word transmitted by parity generator 130 is controlled by a signal received at terminal I from modulonine counter 124. Similarly, the parity sense of each data word generated by parity generator 242 is determined by the output of flip-flop 236 which is connected to the I terminal of parity generator 242. When a high signal is present at terminal I indicating that the last data word received by parity checker 231 had even (inverted) parity, parity generator 242 transmits a data word having even (inverted) parity. Alternatively, when a low signal is present at terminal I indicating that the last data word received by parity checker 231 had odd (noninverted) parity, parity generator 242 transmits an odd (noninverted) parity data word. Thus, the parity sense of a data word transmitted by a particular parity generator 242 is the same as the parity sense of the last data word received by the associated decoder section 239. By controlling parity generator 242 in this manner, the results computed by parity checker 231 are returned to time-slot interchange unit 100 along with the data words transmitted by encoder section 240. This eliminates the need for a separate alarm signal to convey the results.

The data words transmitted by each parity generator 242 are conveyed on one of 32 conductors 243 to a multiplexer 244. Multiplexer 244 uses the time-slot designations generated by offset circuit 220 as controlled by time-slot counter 203 to determine the proper one of the 32 conductors 243 upon which each data word is to be received. Multiplexer 244 receives the data words sequentially on the conductors 243 and transmits them to data interface 140 on the one of the 32-channel time-multiplexed lines 160 designated as line 160-1. The same association between time slots on line 206 and channel circuits exists between time slots on line 160-1 and channel circuits. For example, if a particular channel circuit 238 receives the data words in channel 1 on line 206, data words encoded by that channel circuit 238 will be placed in channel 1 on line 160-1. FIG. 14 shows the timing relationship between line 154-1 and 160-1. A given channel on line 160-1 is transmitted $29\frac{1}{2}$ time slots after the same channel is transmitted on line 154-1. Also illustrated in FIG. 14 is the fact that when a data word having inverted parity is transmitted in channel 1 on line 154-1, an inverted parity data word will be transmitted during the next occurrence of channel 1 on line 160-1 if no errors have occurred. The 32 channels on each of the lines 160 are referred to as source channels. In the system described, only three of the eight lines 160 are in use, lines 160-1 and 160-2 being used to transmit data from line unit 200 and line 160-8 to transmit data from digital facility interface unit 300. An idle code is transmitted on lines 160-3 through 160-7.

Digital facility interface unit 300 (FIG. 7) has the same parity return feature as line unit 200. However, the parity checkers 231 and the parity generators 242 within in line unit 200 each receive only one date word per frame. A parity checker 303 and a parity generator 310 included in digital facility interface unit 300 each receive a stream of 32 data words per frame. Accordingly, no equivalent of flip-flop 236, which is used in line unit 200 to select one time slot per frame, is needed in digital facility interface unit 300. Data interface 140 transmits data words in 32 destination channels on line 154-8 to a reformat and buffer circuit 308 where they are properly formatted for transmission on a T1 carrier system. The parity sense of each data word transmitted on line 154-8 is computed by parity checker 303, which is substantially identical to parity checker 231. The 4.096-megahertz clock signal on conductor 104 and an 8-kilohertz synchronizing pulse transmitted by a delayed sync generator 301 are received at terminals C and S, respectively, to provide internal timing. The 8-kilohertz synchronizing pulse received at terminal S is a delayed version of the 8-kilohertz synchronizing pulse on conductor 105. A delayed pulse is needed to maintain the proper relative timing between parity checker 303 and parity generator 310. Parity checker 303 generates a high signal at terminal E during the full duration of the next time slot after a word having even (inverted) parity is received. The signal at terminal E is connected to the input of a 29-bit shift register 306. Shift register 306 is clocked by the positive transition of the signal at the T output of parity checker 303. As described with reference to parity checker 231, this signal changes from low to high at bit 8 of each time slot and returns to low at bit 1 of the next time slot (see FIG. 11). After 29 positive transitions at terminal T, the output signal from terminal E of parity checker 303, which was generated based upon a data word received by parity checker 303 $29\frac{1}{2}$ time slots previously, reaches the output of shift register 306. Thus, for each data word received by parity checker 303, a signal from terminal E reaches the output of shift register 306 $29\frac{1}{2}$ time slots later. At any given time, signals from terminal E based on the last 29 data words transmitted on line 154-8 are contained in shift register 306.

Data words received from the T1 carrier are buffered so that the $29\frac{1}{2}$ time-slot differential between lines 154-1 and 160-1 (FIG. 14) can be maintained between line 154-8 and a 32-channel time-mulitplexed line 309 used to convey data words incoming from the T1 carrier. Thus, time slot 1 is transmitted on line 309, $29\frac{1}{2}$ time slots after time slot 1 is transmitted on line 154-8. Data words are transmitted in 32 source channels on line 309 and are received by parity generator 310, which is substantially identical to parity generators 130 and 242. The 4.096-megahertz clock signal on conductor 104 and the 8-kilohertz synchronizing pulse on conductor 105 are received at terminals C and S, respectively, to provide internal timing. The parity sense of each data word generated by parity generator 310 is determined by the output of shift register 306 which is connected to the I terminal of parity generator 310. When a high signal is present at terminal I indicating that the data word received by parity checker 303, $29\frac{1}{2}$ time slots earlier had even (inverted) parity, parity generator 310 transmits an even (inverted) parity data word. When a low signal is present at terminal I indicating that the data word received by parity checker 303, $29\frac{1}{2}$ time slots earlier had odd (noninverted) parity, parity generator 310 transmits an odd (noninverted) parity data word. The time delay achieved by shift register 306 is such that the parity sense of a data word transmitted in a given source channel on line 160-8 is the same as the computed parity sense of the last data word routed in the corresponding destination channel on line 154-8. For example, when an even (inverted) parity data word is received in destination channel 13 on line 154-8, the next data word transmitted in source channel 13 on line 160-8 will have even (inverted) parity. Thus, the parity check results for a given 32-channel frame of data on line 154-8 are returned with the next 32-channel frame transmitted on line 160-8.

Recall that time slot interchange 100 multiplexes the data words received from line unit 200 and digital facility interface unit 300 on the 32-channel time-multiplexed lines 160. The data words transmitted on each of the lines 160 are received by data interface 140 where they are shifted at a bit rate of 4.096 megahertz into a 16-bit shift register 161 associated with that line 160. The multiplexing of data words by data interface 140 is controlled in part by a timing circuit 182 which receives, as controlling inputs, the 32.768-megahertz clock signal on conductor 102 and a sequence of address designations from an offset circuit 146. Each address designation from offset circuit 146 is the modulo-eight sum of four and the address designation generated by time-slot counter 144. After each shift register 161 receives a data word, its contents are transmitted in parallel to an associated 16-bit shift register 163. The contents of all eight shift registers 161 are transmitted to their associated shift registers 163 substantially simultaneously in response to a pulse generated on a conductor 184 by timing circuit 182. The pulse on conductor 184 occurs approximately 15½, 32.768-megahertz bit times after the eighth address designation of each group of eight is received by timing circuit 182. As the next data word is being received by each shift register 161, the data words stored in shift registers 163 are transmitted serially to a multiplexer 143 in time sequence on eight conductors 164 at a 32.768-megahertz bit rate. The sequence of transmission of data words from shift registers 163 is also controlled by timing circuit 182. Timing circuit 182, which includes a 1-out-of-8 decoder, transmits the 32.768-megahertz clock signal received on conductor 102 via the one of eight conductors 183 defined by the address designation from offset circuit 146 to clock the bits of the given word out of the designated shift register 163. The address designation from offset circuit 146 is transmitted to multiplexer 143 and defines the particular one of eight conductors 164 upon which a given data word is being routed. The pulse generated on conductor 184 by timing circuit 182 occurs after the last word of each 8-word group is transmitted by its associated shift register 163. The process recurs and mutliplexer 143 transmits the received data words through error detector 126 to a multiplexer 117 on a single 256-channel time multiplexed line 122. Line 122 conveys information in 125-microsecond frames at the same 32.768-megahertz bit rate present on line 120. Channels of each frame on line 122 are numbered from 1 through 256 in time sequence. The timing relationship between time slots on lines 122, 131 and 160-1 is shown in FIGS. 13 and 15. As shown in FIGS. 13 and 15, a given channel on line 122 is transmitted 252 time slots after the same channel is transmitted on line 131.

The parity sense of each data word transmitted on 256-channel line 122 is computed by parity checker 132, which is substantially identical to parity checkers 231 and 303. The 32.768-megahertz clock signal on conductor 102 and the 8-kilohertz synchronizing pulse on conductor 106 are received at terminals C and S, respectively, to provide internal timing. Parity checker 132 generates a high signal at terminal E for the full duration of the next time slot after a data word having even (inverted) parity is received. This signal is referred to as an inverted parity received signal. Recall that an even (inverted) parity data word is transmitted on line 131 during every ninth time slot and that the operation of data interface 140 and line unit 200 in distributing and multiplexing data is symmetrical. Because of the parity return feature incorporated in line unit 200 and digital facility interface unit 300, an even (inverted) parity data word is expected during every ninth time slot on line 122. Because the particular 252 time-slot differential between lines 131 and 122 is an even multiple of nine and because parity checker 132 generates an inverted parity received signal during the time slot after an even (inverted) parity data word has been received, the expected occurrences of inverted parity received signals coincide with count 2 of modulo-nine counter 124 (FIG. 15). Although the particular 252 time-slot differential between time slots on lines 122 and 131 is maintained in this system, other timing relationships could easily be accommodated by using the appropriate count of modulo-nine counter 124. Each time modulo-nine counter 124 is on count 2, a high signal indicating the expected occurrence of an inverted parity received signal is transmitted to error signal generator 134 on a conductor 126. During each time slot, error signal generator 134 compares the signal on conductor 126 with the E output signal of parity checker 132. When the two signals do not agree during a given time slot, an error signal is generated on conductor 135 indicating that at least one of the following four contingencies has occurred: (1) a transmission error has been made, (2) a routing error has been made, (3) the particular channel is not in use, or (4) the system has just been started. It will be recalled that central control unit 12, which receives the error signal on conductor 135, is capable of ignoring error signals resulting from system startup or unused channels. Although shown in FIG. 2 as being directly connected to time-slot interchange unit 100, central control unit 12 could receive control signals including error signals from error signal generator 134 by other means such as in control channels through time-multiplexed switching unit 10.

Multiplexer 117 multiplexes the data words received on line 122 and a similar 256-channel time-multiplexed line 123 from error detector 127 and transmits them to a receive time-slot interchange 113 on a 512-channel time-multiplexed line 115. Receive time-slot interchange 113, under the control of time-slot counter 108 and control random access memory 112, transmits data words on another 512-channel time-multiplexed line 118 in the sequence required by the time-slot assignments within time-multiplexed switching unit 10. The data words are demultiplexed by interface module 101 and transmitted to time-multiplexed switching unit 10 on two 256-channel time-multiplexed lines 13 and 14.

FIG. 15 shows the timing relationship between the signals generated by modulo-nine counter 124 on conductors 125 and 126, data words on lines 131 and 122, the output signal at terminal E of parity checker 132, and the error signal on conductor 135. Frame 10, for example, is transmitted on line 131 having even (inverted) parity data words in time slots 1, 10, 19, ... 253 as indicated by the X in those time slots. The same pattern of even (inverted) parity data words is returned in the next frame on line 122 (assuming no errors have been made).

The capability of the present fault and error detection arrangement to detect routing errors is illustrated by the following two examples. The relationships between the various signals involved in the examples are depicted in FIGS. 16 and 17. In FIGS. 16 and 17, time slots having even (inverted) parity data words are marked with an X. Assume that the first time slot in each group of eight time slots on 256-channel line 131 is associated with 32-channel line 154-1 and that time slots 1 through 32 on line 154-1 are associated with channel circuits numbered 1 through 32, respectively. First consider that a data word having even (inverted) parity is transmitted during time slot 1 on line 131 (FIG. 16) and is properly routed to line 154-1 by data interface 140. However, demultiplexer 207 erroneoulsy routes the data word to channel circuit number 2 rather than number 1. Parity checker 231 for channel number 2 properly detects even (inverted) parity for the data word and parity generator 242 responds by transmitting an even (inverted) parity data word, which is placed in time slot 2 on line 160-1 by multiplexer 244. Data interface 140 properly places this word in time slot 9 on line 122 being the first time slot in the second group of eight time slots. As a result, the parity sense computed by parity checker 132 does not agree with the parity sense expected (count 2 of modulo-nine counter 124) during either time slot 1 or 9 and an error signal is generated on conductor 135 due to each time slot because of the improper routing.

As a second example (FIG. 17), consider the following variation on the first example. Rather than only routing the data word in channel 1 on line 154-1 to channel circuit number 2, demultiplexer 207 transmits that data word to both channel circuit number 1 and channel circuit number 2. Assuming that no other errors are made, even (inverted) parity data words are returned in both time slots 1 and 9 on line 122. Since a data word having even (inverted) parity is expected in time slot 1 but not in time slot 9, an error signal is generated in response to the parity sense of the data word time slot 9. Note that a conventional odd parity check arrangement would not have detected errors in either situations since odd parity would have been returned irrespective of routing.

It is to be understood that the above-described embodiment is merely illustrative of the principles of the invention and that other arrangements may be devised by those skilled in the art without departing from the spirit and scope of the invention. For example, in the time division system just described, data word routing between time-multiplexed lines 131 and 122 and channel circuits 238 could be checked by initiating a pattern of odd and even parity at each of the channel circuits 238, returning the parity pattern received on line 122 in the next frame of data words transmitted on line 131, and then checking parity at each channel circuit to determine errors. Further, the principles of the invention can be easily appllied to systems using error checking codes other than parity checking—for example, residue codes.

What is claimed is:

1. A fault and error detection arrangement comprising:

central data transmitting means for transmitting data words comprising a data portion and a parity bit derived from that data portion in predetermined channels on a first central time-multiplexed line;

a plurality of peripheral circuits; and connection means for routing data words from said first central time-multiplexed line to said plurality of peripheral circuits such that each of said peripheral circuits receives data words from a unique one of said channels on said first central time-multiplexed line;

wherein each of said plurality of peripheral circuits comprises peripheral parity checking means connected to said connection means for generating parity invert signals when the parity bit of a data word routed to said peripheral circuit by said connection means is found to be inverted, peripheral data transmitting means for transmitting to said connection means data words comprising a data portion and a parity bit derived from that data portion, and peripheral parity inverting means connected to the peripheral parity checking means and the peripheral data transmitting means of that peripheral circuit and responsive to said parity invert signals for inverting the parity bit of the next data word transmitted to said connection means by the peripheral data transmitting means of that peripheral circuit after the generation of one of said parity invert signal;

wherein said connection means further comprises means connected to the peripheral data transmitting means of each of said plurality of peripheral circuits for routing data words, transmitted to said connection means by the peripheral data transmitting means of each of said plurality of peripheral circuits, to a unique one of a plurality of channels on a second central time-multiplexed line; and wherein said fault and error detection arrangement further comprises central parity checking means, connected to said connection means by said second central time-multiplexed line and responsive to data words on said second central time-multiplexed line, for generating an inverted parity received signal when the parity bit of a given data word on said second central time-multiplexed line is determined to be inverted.

2. A fault and error detection arrangement comprising:

central data transmitting means for transmitting data words comprising a data portion and a parity bit derived from that data portion in predetermined channels on a first central time-multiplexed line;

a peripheral circuit comprising a first peripheral time-multiplexed line having a plurality of destination channels, peripheral parity checking means for generating a parity invert signal when the parity bit of a given data word received by said peripheral circuit in one of said plurality of destination channels is determined to be inverted, a second peripheral time-multiplexed line having a plurality of source channels, peripheral data transmitting means for transmitting data words comprising a data portion and a parity bit derived from that data portion in said plurality of source channels, channel defining means responsive to each of said parity invert signals for transmitting a channel defining signal defining the one of said plurality of source channels having a predetermined relationship to that parity invert signal and peripheral parity inverting means responsive to each of said channel defining signals for inverting the parity bit of a data word transmitted by said peripheral data transmitting means in the one of said plurality of source channels defined by that channel defining signal;

connection means for routing data words to each of said destination channels from a channel on said first central time-multiplexed line and for routing data words from each of said source channels to one of a plurality of channels on a second central time-multiplexed line; and central parity checking means, responsive to data words on said second central time-multiplexed line, for generating an inverted parity received signal when the parity bit of a data word in a given channel on said second central time-multiplexed line is determined to be inverted.

3. A fault and error detection arrangement in accordance with claims 1 or 2 further comprising:

central parity inverting means connected to said central data transmitting means and said first central time-multiplexed line for inverting the parity bit of certain ones of said data words transmitted by said central data transmitting means.

4. A fault and error detection arrangement in accordance with claim 3 further comprising:

sequence generating means for generating a sequence of inverted parity expected signals defining the particular ones of said channels on said second central time-multiplexed line in which inverted parity data words are expected; and error signal generating means responsive to said inverted parity received signals and said inverted parity expected signals for generating error signals when said inverted parity received signals indicate that an inverted parity data word was received in a channel in which a noninverted parity data word was expected and when said inverted parity received signals indicate that a noninverted parity data word was received in a channel in which an inverted parity data word was expected.

5. A fault and error detection arrangement in accordance with claims 1 or 2 further comprising:
first sequence generating means for generating a sequence of inverted parity transmit signals defining certain ones of said data words transmitted by said central data transmitting means;
central parity inverting means connected to said central data transmitting means and said first central time-multiplexed line and responsive to said inverted parity transmit signals for inverting the parity bit of the ones of said data words transmitted by said central data transmitting means that are defined by said inverted parity transmit signals;
second sequence generating means responsive to said inverted parity transmit signals for generating a sequence of inverted parity expected signals defining the particular ones of said channels on said second central time-multiplexed line in which inverted parity data words are expected; and
error signal generating means responsive to said inverted parity received signals and said inverted parity expected signals for generating error signals when said inverted parity received signals indicate that an inverted parity data word was received in a channel in which a noninverted parity data word was expected and when said inverted parity received signals indicate that a noninverted parity data word was received in a channel in which an inverted parity data word was expected.

6. A fault and error detection arrangement in accordance with claims 1 or 2 further comprising:
central parity inverting means connected to said central data transmitting means and said first central time-multiplexed line for inverting the parity bit of every Nth data word transmitted by said central data transmitting means, N being a positive integer having no factors in common with C, the number of said predetermined channels on said first central time-multiplexed line.

7. A fault and error detection arrangement in accordance with claim 6 wherein said channels on said first central time-multiplexed line are in 1-to-1 correspondence with said channels on said second central time-multiplexed line further comprising:
sequence generating means for generating a sequence of inverted parity expected signals corresponding to every Nth channel on said second central time-multiplexed line; and
error signal generating means responsive to said inverted parity received signals and said inverted parity expected signals for generating error signals when said inverted parity received signals indicate that an inverted parity data word was received in a channel in which a noninverted parity data word was expected and when said inverted parity received signals indicate that a noninverted parity data word was received in a channel in which an inverted parity data word was expected.

8. A fault and error detection arrangement comprising:
first data transmitting means for transmitting data words comprising a data portion and a parity bit derived from that data portion in time-separated channels on a first central time-multiplexed line;
a plurality of peripheral circuits; and
connection means for routing data words from said first central time-multiplexed line to said plurality of peripheral circuits;
wherein each of said plurality of peripheral circuits comprises peripheral parity checking means connected to said connection means for generating parity invert signals when the parity bit of a data word routed to said peripheral circuit by said connection means is found to be inverted, second data transmitting means for transmitting to said connection means data words comprising a data portion and a parity bit derived from that data portion, and peripheral parity inverting means connected to the peripheral parity checking means and the second data transmitting means of that peripheral circuit and responsive to each of said parity invert signals for inverting the parity bit of a predetermined one of the data words transmitted to said connection means by the second data transmitting means of that peripheral circuit;
wherein said connection means further comprises means connected to the second data transmitting means of each of said plurality of peripheral circuits for routing data words from said plurality of peripheral circuits to a plurality of time-separated channels on a second central time-multiplexed line; and
wherein said fault and error detection arrangement further comprises central parity checking means, connected to said connection means by said second central time-multiplexed line and responsive to data words on said second central time-multiplexed line, for generating an inverted parity received signal when the parity bit of a given data word on said second central time-multiplexed line is determined to be inverted.

9. A fault and error detection arrangement in accordance with claim 8 further comprising:
central parity inverting means connected to said first data transmitting means and said first central time-multiplexed line for inverting the parity bit of certain ones of said data words transmitted by said first data transmitting means.

10. A fault and error detection arrangement in accordance with claim 9 further comprising:
sequence generating means for generating a sequence of inverted parity expected signals defining the particular ones of said channels on said second central time-multiplexed line in which inverted parity data words are expected; and
error signal generating means responsive to said inverted parity received signals and said inverted parity expected signals for generating error signals when said inverted parity received signals indicate that an inverted parity data word was received in a channel in which a noninverted parity data word was expected and when said inverted parity received signals indicate that a noninverted parity data word was received in a channel in which an inverted parity data word was expected.

11. A fault and error detection arrangement in accordance with claim 8 further comprising:
first sequence generating means for generating a sequence of inverted parity transmit signals defining certain ones of said data words transmitted by said first data transmitting means;
central parity inverting means connected to said first data transmitting means and said first central time-multiplexed line and responsive to said inverted parity transmit signals for inverting the parity bit of the ones of said data words transmitted by said first data transmitting means that are defined by said inverted parity transmit signals;

second sequence generating means responsive to said inverted parity transmit signals for generating a sequence of inverted parity expected signals defining the particular ones of said channels on said second central time-multiplexed line in which inverted parity data words are expected; and error signal generating means responsive to said inverted parity received signals and said inverted parity expected signals for generating error signals when said inverted parity received signals indicate that an inverted parity data word was received in a channel in which a noninverted parity data word was expected and when said inverted parity received signals indicate that a noninverted parity data word was received in a channel in which an inverted parity data word was expected.

12. A fault and error detection arrangement comprising:

central data transmitting means for transmitting data words comprising a data portion and an error check portion derived as a first predefined function of that data portion in predetermined channels on a first central time-multiplexed line;

means connected to said central data transmitting means and said first central time-multiplexed line for altering the error check portion of certain ones of said data words transmitted by said central data transmitting means;

a plurality of peripheral circuits; and connection means for routing data words from said first central time-multiplexed line to said plurality of peripheral circuits such that each of said peripheral circuits receives data words from a unique one of said channels on said first central time-multiplexed line;

wherein each of said plurality of peripheral circuits comprises peripheral error checking means connected to said connection means for generating error check alter signals when the error check portion of a data word routed to said peripheral circuit by said connection means cannot be derived as said first predefined function of the data portion of that data word, peripheral data transmitting means for transmitting to said connection means data words comprising a data portion and an error check portion derived as a second predefined function of that data portion, wherein said first and second predefined functions may be identical, and peripheral altering means connected to the peripheral error checking means and the peripheral data transmitting means of that peripheral circuit and responsive to said error check alter signals for altering the error check portion of the next data word transmitted to said connection means by the peripheral data transmitting means of that peripheral circuit after the generation of one of said error check alter signals;

wherein said connection means further comprises means connected to the peripheral data transmitting means of each of said plurality of peripheral circuits for routing data words from each of said plurality of peripheral circuits to a unique one of a plurality of channels on a second central time-multiplexed line; and wherein said fault and error detection arrangement further comprises central error checking means, connected to said connection means by said second central time-multiplexed line and responsive to data words on said second central time-multiplexed line, for generating an altered error check received signal when the error check portion of a given data word on said second central time-multiplexed line cannot be derived as said second predefined function of the data portion of that data word.

13. A fault and error detection arrangement comprising:

central data transmitting means for transmitting data words comprising a data portion and an error check portion derived as a first predefined function of that data portion in predetermined channels on a first central time-multiplexed line;

means connected to said central data transmitting means and said first central time-multiplexed line for altering the error check portion of certain ones of said data words transmitted by said central data transmitting means;

a peripheral circuit comprising a first peripheral time-multiplexed line having a plurality of destination channels, peripheral error checking means for generating an error check alter signal when the error check portion of a given data word received by said peripheral circuit in one of said plurality of destination channels cannot be derived as said first predefined function of the data portion of that data word, a second peripheral time-multiplexed line having a plurality of source channels, peripheral data transmitting means for transmitting data words comprising a data portion and an error check portion derived as a second predefined function of that data portion in said plurality of source channels, wherein said first and second predefined functions may be identical, channel defining means responsive to each of said error check alter signals for transmitting a channel defining signal defining the one of said plurality of source channels having a predetermined relationship to that error check alter signal and peripheral altering means responsive to each of said channel defining signals for altering the error check portion of a data word transmitted by said peripheral data transmitting means in the one of said plurality of source channels defined by that channel defining signal;

connection means for routing data words to each of said destination channels from a channel on said first central time-multiplexed line and for routing data words from each of said source channels to one of a plurality of channels on a second central time-multiplexed line; and central error checking means, responsive to data words on said second central time-multiplexed line, for generating an altered error check received signal when the error check portion of a data word in a given channel on said second central time-multiplexed line cannot be derived as said second predefined function of the data portion of that data word.

14. A fault and error detection arrangement comprising:

a peripheral circuit comprising peripheral data transmitting means for transmitting data words comprising a data portion and a parity bit derived from that data portion on a first peripheral line and means connected to said peripheral data transmitting means and said first peripheral line for inverting the parity bit of certain ones of said data words transmitted by said peripheral data transmitting means;

connection means for routing data words from said first peripheral line to a given one of a fixed number of destination channels on a first central time-multiplexed line; and a central circuit comprising central parity checking means connected to said connection means by said first central time-multiplexed line for generating a parity invert signal when the parity bit of a given data word routed by said connection means to said central circuit in said given one of said fixed number of said destination channels on said first central time-multiplexed line is determined to be inverted, central data transmitting means for transmitting to said connection means data words comprising a data portion and a parity bit derived from that data portion in a fixed number of source channels on a second central time-multiplexed line, wherein said source channels are in 1-to-1 correspondence with said destination channels, and means connected to said central parity checking means and said central data transmitting means and responsive to said parity invert signal for inverting the parity bit of the next data word transmitted to said connection means in the one of said fixed number of said source channels corresponding to said given one of said fixed number of said destination channels after the receipt of said parity invert signal;

wherein said connection means further comprises means connected to said second central time-multiplexed line for routing data words transmitted by said central data transmitting means in said one of said fixed number of said source channels on said second central time-multiplexed line corresponding to said given one of said fixed number of said destination channels, to said peripheral circuit on a second peripheral line; and wherein said peripheral circuit further comprises peripheral parity checking means connected to said connection means by said second peripheral line for generating an inverted parity received signal when the parity bit of a given data word on said second peripheral line is determined to be inverted.

15. In a fault and error detection arrangement, a circuit comprising:

first data transmitting means for transmitting data words each comprising a data portion and a parity bit on a first conduction path;

parity checking means for generating parity invert signals when the parity bit of a data word on said first conduction path is determined to be inverted;

second data transmittng means for transmitting data words comprising a data portion and a parity bit on a second conduction path; and first parity inverting means connected to said parity checking means and said second data transmitting means, first parity inverting means responsive to said parity invert signals for inverting the parity bit of a predetermined one of the data words transmitted by said second data transmitting means.

16. In a fault and error detection arrangement, a circuit in accordance with claim 15 furthter comprising:

second parity inverting means connected to said first data transmittig means and said first conduction path for inverting the parity bit of certain ones of said data words transmitted by said first data transmitting means.

* * * * *